(12) United States Patent
Nguyen et al.

(10) Patent No.: US 6,340,521 B1
(45) Date of Patent: Jan. 22, 2002

(54) MAGNETIC RECORDING MEDIUM WITH PROTECTIVE BARRIER LAYER

(75) Inventors: Phuong Nguyen, Milpitas; Thanh Ha, San Jose; Elsie Yang Chuang, Cupertino, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/436,495

(22) Filed: Nov. 9, 1999

Related U.S. Application Data

(60) Provisional application No. 60/107,869, filed on Nov. 9, 1998.

(51) Int. Cl.⁷ .................................................. G11B 5/72
(52) U.S. Cl. ............... 428/336; 428/408; 428/694 TC; 428/694 TP; 428/689; 428/702; 428/900; 427/131; 204/192.15; 204/192.16
(58) Field of Search ........................ 428/336, 408, 428/694 TC, 694 TP, 689, 702, 900; 427/131; 204/192.15, 192.16

(56) References Cited

U.S. PATENT DOCUMENTS

| | | | |
|---|---|---|---|
| 4,124,736 A | 11/1978 | Patel et al. .................. 428/622 |
| 4,610,911 A | 9/1986 | Opfer et al. ................. 428/213 |
| 4,631,202 A | 12/1986 | Opfer et al. ................. 427/131 |
| 4,929,500 A | 5/1990 | Yamashita et al. .......... 428/336 |
| 5,316,844 A | 5/1994 | Suzuki et al. ............... 428/323 |
| 5,464,674 A | 11/1995 | Makino te al. .......... 428/694 T |
| 5,562,982 A | 10/1996 | Hiwatashi ................... 428/332 |
| 5,679,431 A | * 10/1997 | Chen et al. ................ 428/65.3 |
| 5,679,454 A | 10/1997 | Hiwatashi ................... 428/332 |
| 5,776,602 A | * 7/1998 | Ueda et al. .................. 428/332 |
| 5,855,746 A | * 1/1999 | Prabhakara et al. ... 204/192.16 |
| 5,871,841 A | * 2/1999 | Kuratomi .................... 428/332 |

* cited by examiner

Primary Examiner—Stevan A. Resan
(74) Attorney, Agent, or Firm—McDermott, Will & Emery

(57) ABSTRACT

A magnetic medium is formed with a barrier layer between the magnetic layer and protective overcoat to prevent degradation of magnetic properties during deposition of the protective overcoat due to poisoning effects by reactive gases on the magnetic layer. Embodiments include sputter depositing a Cr or Cr alloy barrier layer, having a thickness of about 5 Å to about 25 Å, on a magnetic layer and sputter depositing a protective overcoat containing carbon and nitrogen on the barrier layer in a nitrogen-containing environment.

6 Claims, 5 Drawing Sheets

MAGNETIC RECORDING MEDIUM WITH PROTECTIVE BARRIER LAYER

RELATED APPLICATIONS

This application claims priority from provisional patent application Ser. No. 60/107,869 filed Nov. 9, 1998 entitled "Magnetic Poisoning Reduction And Prevention By Metallic And Nonmetallic Barrier Layer", the entire disclosure of which is hereby incorporated by reference herein.

TECHNICAL FIELD

The present invention relates to magnetic recording media, particularly rotatable magnetoresistance (MR) or giant magnetoresistance (GMR) recording media, such as thin film magnetic disks cooperating with a magnetic transducer head. The present invention has particular applicability to high areal density magnetic recording media designed for drive programs having reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al—Mg) alloy, plated with a layer or amorphous nickel-phosphorus (NiP). Alternative substrates include glass, ceramic, glass-ceramic, and polymeric materials and graphite. The substrate typically contains sequentially deposited on each side thereof at least an underlayer, such as chromium (Cr) or a Cr alloy, e.g., chromium vanadium (CrV), a cobalt (Co)—based alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluro polyether (PFPE) which consists essentially of carbon, fluorine and oxygen atoms. The lubricant is typically dissolved in an organic solvent, applied and bonded to the carbon overcoat of the magnetic recording medium by techniques such as dipping, buffing, thermal treatment, ultraviolet (UV) irradiation and soaking. A significant factor in the performance of a lubricant topcoat is the bonded lube ratio which is the ratio of the amount of lubricant bonded directly to the carbon overcoat of the magnetic recording medium to the amount of lubricant bonded to itself or to a mobile lubricant. Desirably, the bonded lube ratio should be between 0.3 to 0.7 (e.g. about 0.5 (50%)) to realize a meaningful improvement in stiction and wear performance of the resulting magnetic recording medium.

The escalating requirements for high areal recording density impose increasingly greater requirements on thin film magnetic recording media in terms of coercivity, stiction, squareness, medium noise and narrow track recording performance. In addition, increasingly high areal recording density and large capacity magnetic disks require smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogenated-nitrogenated carbon. These types of carbon are well known in the art and, hence, not set forth herein in great detail.

Generally, hydrogenated carbon or amorphous hydrogenated carbon has a hydrogen concentration of about 5 at. % to abut 40 at. %, typically about 20 at. % to about 30 at. %. Hydrogenated carbon has a lower conductivity due to the elimination of the carbon band-gap states by hydrogen. Hydrogenated carbon also provides effective corrosion protection to an underlying magnetic layer. Amorphous carbon nitride, sometimes referred to as nitrogenated carbon, generally has a nitrogen to hydrogen concentration ration of about 5:20 to about 30:0. Hydrogenated-nitrogenated carbon generally has a hydrogen to nitrogen concentration ration of about 30:10 to 20:10 (higher concentration of hydrogen than nitrogen). Amorphous (a) hydrogen-nitrogenated carbon can be represented by the formula a—CH,Ny, wherein "x" is about 0.05 (5.0 at. %) to about 0.20 (20 at. %), such as about 0.1 (10 at. %) to about 0.2 (20 at. %), and "y" about 0.03 (3.0 at. %) to about 0.30 (30 at. %), such as about 0.03 (3.0 at. %) to about 0.07 (7.0 at. %). A particularly suitable composition is a—CH$_{.15}$N$_{.05}$. Graphitic carbon or graphite contains substantially no hydrogen and nitrogen.

Patel et al., in U.S. Pat. No. 4,124,736, disclose a magnetic recording medium comprising a barrier layer, having a thickness of 0.5 to 10 micro-inches between a magnetic layer and protective oxide layer. Opfer et al., in U.S. Pat. Nos. 4,610,911 and 4,631,202, disclose a magnetic recording medium comprising a Cr barrier layer having a thickness of 100 Å to 600 Å between a magnetic layer and protective oxide coating. Hiwatashi, in U.S. Pat. Nos. 5,562,982 and 5,679,454, disclose a magnetic recording medium containing a Cr buffer layer, having a thickness of 100 Å to 200 Å, between a magnetic layer and a hydrogen-containing carbon protective layer. Suzuki et al., in U.S. Pat. No. 5,316,844, disclose a magnetic recording medium comprising a first-protective film of Cr having a thickness of 29 Å to 150 Å on a magnetic layer, and a second protective film containing particles dispersed in an inorganic oxide film. Makino et al., in U.S. Pat. No. 5,464,674, disclose a magnetic recording medium comprising a Cr protective layer, having a thickness of 40 Å to 2000 Å, between a magnetic layer and an oxide film. Yamashita et al., in U.S. Pat. No. 4,929,500, disclose a magnetic recording medium containing a protective zirconium film having a thickness of 100 Å to 600 Å.

It was found, however, that the magnetic properties of a conventional magnetic layer deteriorated upon sputter depositing a protective overcoat in a nitrogen-containing atmosphere., as when depositing a protective overcoat containing carbon and nitrogen. Accordingly, there exists a need for methodology enabling the manufacture of a magnetic recording medium containing a magnetic layer and a protective overcoat containing carbon and nitrogen without degradation of magnetic and parametric properties of the magnetic layer as a result of applying the protective overcoat.

Disclosure of the Invention

An advantage of the present invention is a magnetic recording medium comprising a protective overcoat containing carbon and nitrogen wherein the magnetic layer has not undergone degradation of its magnetic or parametric properties due to deposition of the protective overcoat.

Another advantage of the present invention is a method of manufacturing a magnetic recording medium, the method comprising sputter depositing a protective overcoat containing carbon and nitrogen in a nitrogen-containing atmosphere on a magnetic layer without degrading the magnetic or parametric properties of the magnetic layer.

Additional advantages and other features of the present invention will be set forth in the description which follows and in part will become apparent to those having ordinary school in the art upon examination of the following or may be learned from the practice of the present invention. The advantages of the present invention may be realized and obtained as particularly pointed out in the appended claims.

According to the present invention, the foregoing and other advantages are achieved in part by a magnetic recording medium comprising: a magnetic layer; a barrier layer on the magnetic layer; and a protective overcoat, containing carbon and nitrogen, on the barrier layer.

Another aspect of the present invention is a method of manufacturing a magnetic recording medium, the method comprising: sputter depositing a barrier layer on a magnetic layer; and sputter depositing a protective overcoat, containing carbon and nitrogen, on the barrier layer in a nitrogen-containing atmosphere.

Embodiments of the present invention comprise sputter depositing a non-metallic or metallic, e.g., Cr or Cr alloy, layer at a thickness of about 5 Å to about 25 Å on a magnetic layer and sputter depositing an amorphous nitrogenated carbon or amorphous hydrogenated-nitrogenated carbon protective overcoat on the magnetic layer in an atmosphere containing at least 0.025 volume % nitrogen.

Additional advantages of the invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
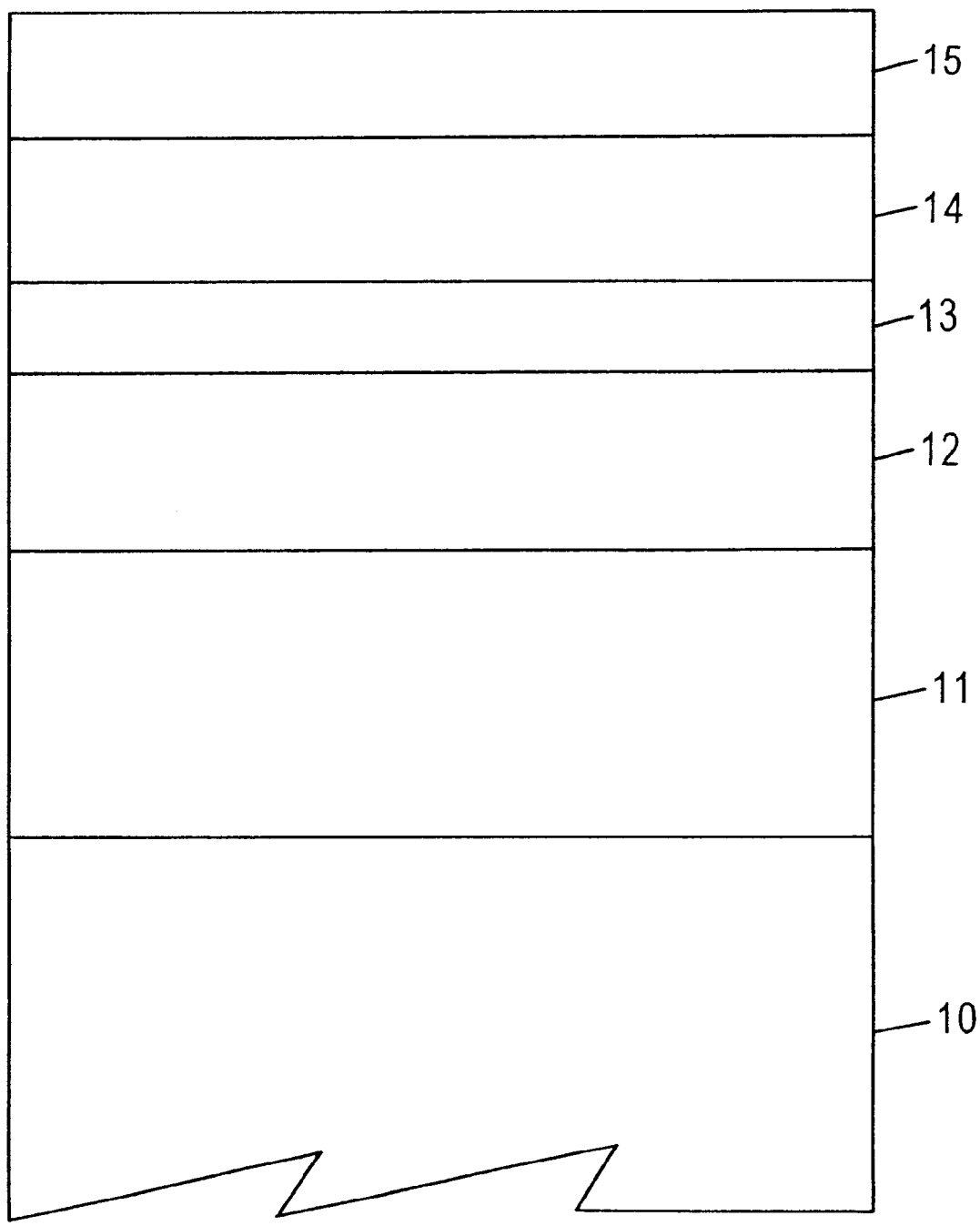
FIG. 1 schematically illustrates a magnetic recording medium in accordance with an embodiment of the present invention.

The present invention addresses and solves the problem of magnetic property and parametric performance degradation upon depositing, as by sputter deposition, a protective overcoat on a magnetic layer in a gaseous environment containing nitrogen. Based upon extensive experimentation and investigation, it is believed that the source of the problem of magnetic and parametric property degradation of a magnetic layer upon sputter depositing a protective overcoat stems from the poisoning effects of reactive gases, such as nitrogen, in the reactive sputtering chamber. Such degradation of magnetic and parametric properties has been observed in various conventional magnetic alloy layers, such as Co—Cr magnetic alloy layers, e.g., cobalt-chromium-platinum, cobalt-chromium-tantalum, cobalt-chromium-platinum-tantalum and cobalt-chromium-platinum-tantalum-niobium alloys.

The present invention addresses and solves the degradation problem of magnetic alloy degradation during sputter depositing of the protective overcoat, e.g., a carbon-containing overcoat, such as a protective overcoat containing carbon, nitrogen, and hydrogen, in an atmosphere containing as low as 0.25 volume % nitrogen. The magnetic properties adversely impacted by the presence of nitrogen during sputtering include remanent coercivity coercivity (Hcr), magnetic remanence (Mr) expressed as a product of thickness (Mrt), coercivity squareness (S*), signal to noise ratio (SNR), high frequency rack average amplitude (HFTAA) resolution (Res), half-amplitude pulse width (PW50), and overwrite (OW). The present invention addresses and solves the degradation of such properties during sputter depositing a protective overcoat in a nitrogen-containing atmosphere by providing a thin barrier layer on the magnetic layer prior to sputter depositing the protective overcoat. The barrier layer can comprise any of a variety of materials, including metallic materials and non-metallic materials. For example, suitable metallic materials include metals such as Cr, vanadium, tungsten, titanium, aluminum, and alloys thereof containing up to 99 atomic per cent of alloying elements. Suitable non-metallic materials include chromium oxide, titanium oxide, aluminum oxide, hafnium oxide, zirconium oxide and graphitic carbon. Particularly suitable results have been obtained employing Cr or a Cr alloy containing up to 99 atomic per cent of an alloying element for the barrier layer.

The exact mechanism underpinning degradation of the magnetic properties and parametric performance of a magnetic layer by virtue of sputter depositing a protective overcoat in a nitrogen-containing atmosphere is not known with certainty. Conventional practices comprise depositing a carbon-containing overcoat, typically a protective overcoat containing carbon, nitrogen and hydrogen, by reactive sputtering to obtain a protective overcoat having improved physical and chemical properties. Nitrogen is typically employed in the carbon deposition chamber to improve wear resistance and impact strength, and to reduce stiction and friction. However, it is believed that the nitrogen gas adversely impacts magnetic properties and parametric performance by diffusing into and reacting with the magnetic layer, thereby degrading magnetic properties and parametric performance. It was found that a thin protective barrier layer, such as about 5Å to about 25 Å, typically about 10 Å to about 20 Å, is effective to prevent such degradation of the magnetic properties and parametric performance of the magnetic layer. A suitable thickness range also includes about 5 Å to about 20 Å, e.g. about 5 Å to about 10 Å.

An embodiment of the present invention is schematically illustrated in FIG. 1 and comprises substrate 10, e.g., a glass, glass ceramic, or ceramic substrate, or an aluminum alloy substrate such as an aluminum-magnesium alloy with a nickel-phosphorous coating thereon. Any conventional substrate material can be employed in the practice of the present invention. An underlayer 11 is formed on the substrate. Underlayer 11 can comprise any conventional underlayer material employed in the manufacture of magnetic recording media such as a Cr or Cr alloy underlayer, e.g., chromium-vanadium or chromium-molybdenum. The magnetic alloy layer 12 is then deposited on underlayer 11. Magnetic layer 12 can comprise any conventional magnetic material employed in the manufacture of magnetic recording media, such as Co alloys, e.g., Co—Cr alloys. In accordance with the present invention, a thin barrier layer 13, e.g., Cr or a Cr alloy, is deposited on magnetic layer 12, at a suitable thickness of about 5 Å to about 25 Å, such as about 5 Å to about 20 Å, e.g., about 5 Å to about 10 Å, or about 10 Å to about 20 Å, to prevent degradation of the magnetic properties and parametric performance of magnetic layer 12 during subsequent sputter deposition of protective overcoat 14. Protective overcoat 14 can comprise a conventional carbon-containing overcoat, such as a nitrogenated carbon overcoat typically having a nitrogen to hydrogen concentration ration of about 5:20 to about 30:0, or a hydrogenated-nitrogenated carbon protective overcoat represented by the formula $aCH_xN_y$, wherein "x" is about 5 to about 20 atomic %, e.g., about 10 to about 20 atomic %, and "y" is about 3 to about 30 atomic percent, such as about 3 to about 7 atomic percent. A lubricant topcoat 15, e.g., a conventional PFPE lubricant, is applied to protective overcoat 14. The barrier layer 13 is advantageously deposited in an inert atmosphere, such as an atmosphere containing argon, to ensure preservation of the magnetic properties and parametric performance of magnetic alloy layer 12.

EXAMPLES

Figure 2:
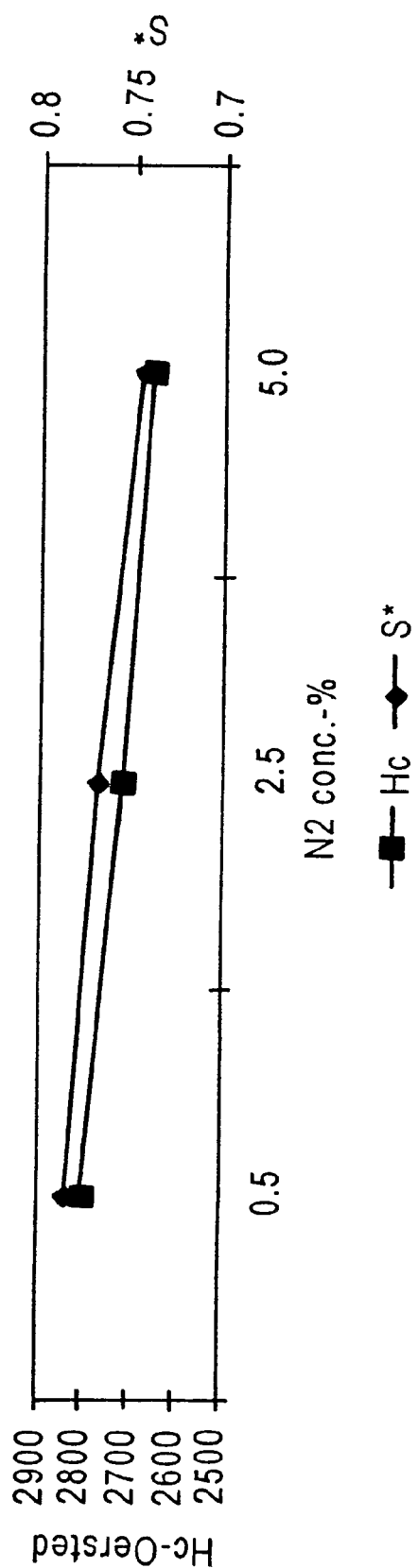
FIG. 2 illustrates the effects of nitrogen concentration on parametric performance.
Figure 3A:
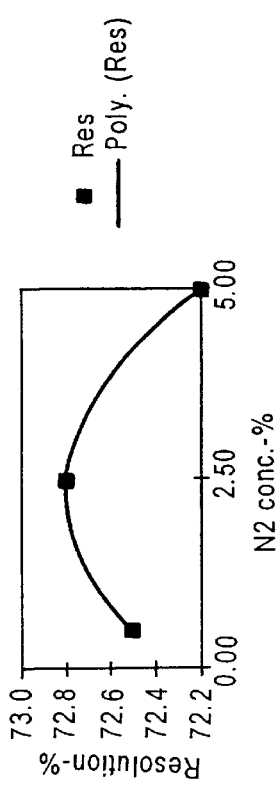
FIGS. 3A–3F illustrate the effects of Cr barrier layer thickness on magnetic properties.
Figure 3B:
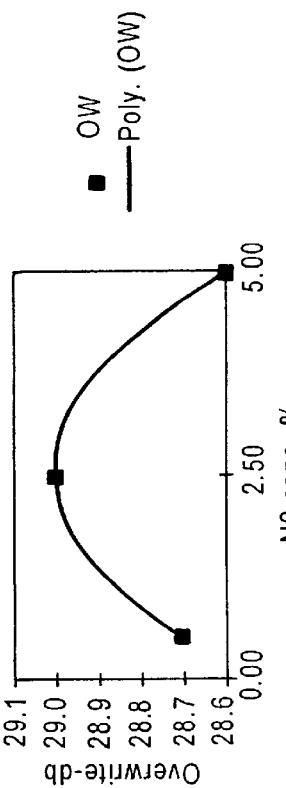
Figure 3C:
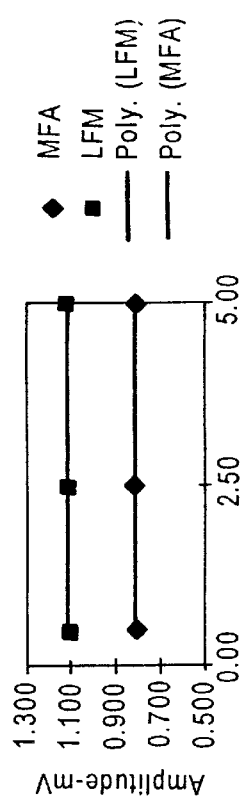
Figure 3D:
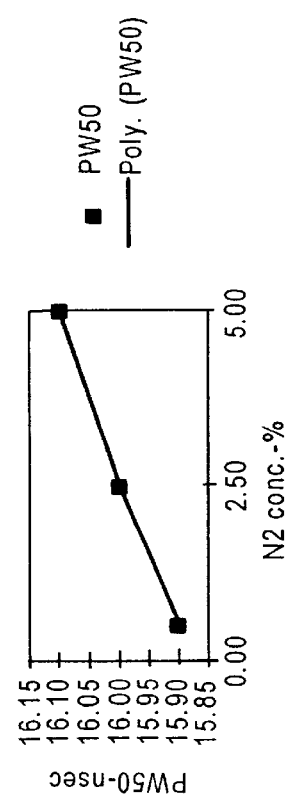
Figure 3E:
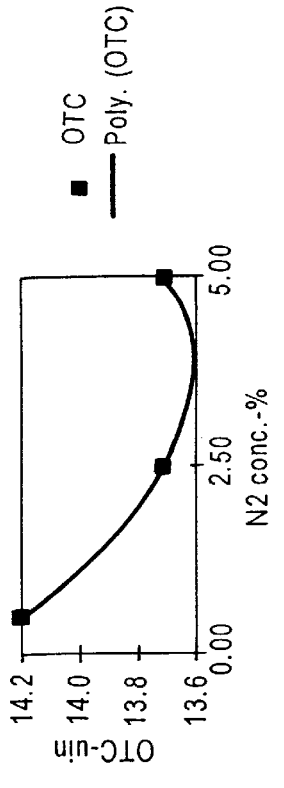
Figure 3F:
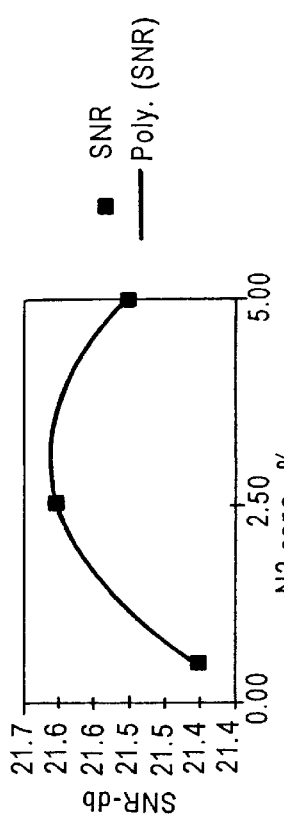

Testing was conducted to illustrate the degradative effects of nitrogen during sputter deposition of a protective overcoat on a magnetic layer and to demonstrate the prevention of such degradation employing a barrier layer in accordance with the present invention. Magnetic properties such as Hcr, Mrt and S*, with or without barrier layers, were measured with a non-contact Turbo Rotating Disk Magnetometed (TRDM), and parametric performance, such as HFTAA, Res, PW50, OW and SNR, were measured using a commercial Guzik tester with a magnetoresistive (MR) head. The degradative effect of nitrogen on Hcr, Mrt and S* are reported in Table 1 below and illustrated in FIG. 2.

TABLE 1

Effects of N2 Poisoning on Magnetic Properties

| Sample # | $N_2$ composition % | Hcr Oersted | S* | Mrt Memu/cm$^2$ |
|---|---|---|---|---|
| Sample 1 | 0.5 | 2804 | 0.785 | 0.645 |
| Sample 2 | 2.5 | 2716 | 0.767 | 0.655 |
| Sample 3 | 5.0 | 2654 | 0.744 | 0.656 |

The impact of nitrogen concentration on parametric performance, such as mid-frequency amplitude (MFA), low-frequency amplitude (LFA), Res, PW50, OW, wide-band noise (NVBN), SNR and off-track capability (OTC) are reported in Table 2 below and illustrated in FIGS. 3A–3F. Over the nitrogen range studied, some impact on parametric performance is observed.

TABLE 2

The Effect of Nitrogen Concentration on Parametric Performance

| Media | $N_2$ | Hcr | Mrt | S* | MFA | LFA | Res | PW5 | OW | WB | SNR | OT |
|---|---|---|---|---|---|---|---|---|---|---|---|---|
| Sample 1 | 0.50 | 2808 | 0.645 | 0.79 | 0.807 | 1.113 | 72.5 | 15.90 | 28.7 | 28.2 | 21.4 | 14. |
| Sample 2 | 2.50 | 2716 | 0.655 | 0.77 | 0.814 | 1.118 | 72. | 16.00 | 29.0 | 27.9 | 21.6 | 13. |
| Sample 3 | 5.00 | 2654 | 0.656 | 0.74 | 0.807 | 1.118 | 72.2 | 16.10 | 28.6 | 27.7 | 21.5 | 13. |

Figure 4:
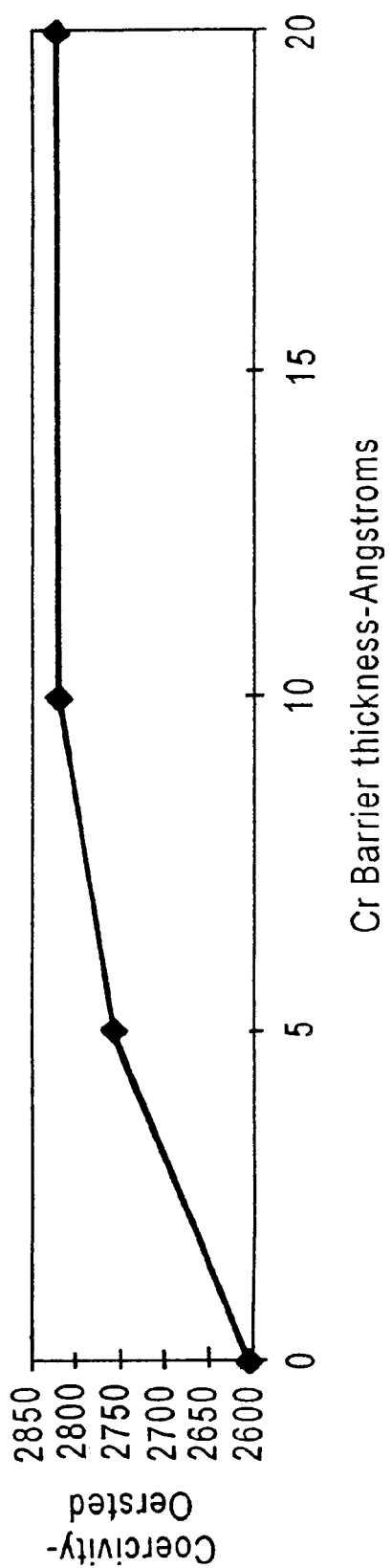
FIG. 4 illustrates the effects of Cr barrier thickness on parametric performance.
Figure 5A:
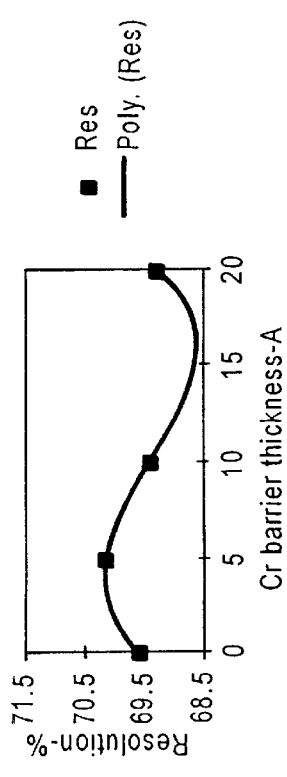
FIGS. 5A–5F illustrate the effects of Cr barrier layer thickness on various parametric properties.
Figure 5B:
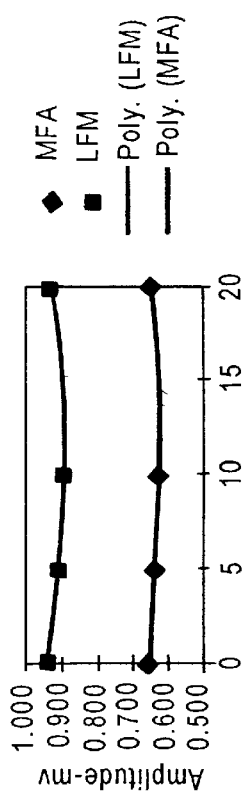
Figure 5C:
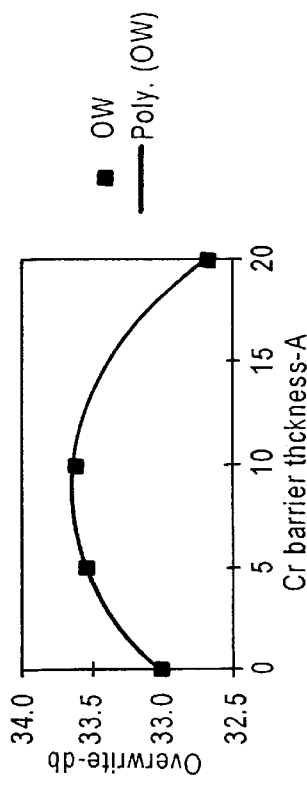
Figure 5D:
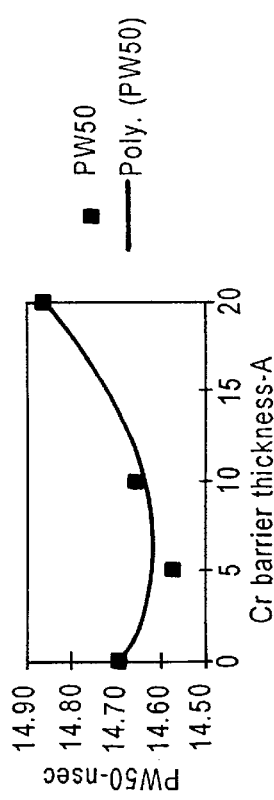
Figure 5E:
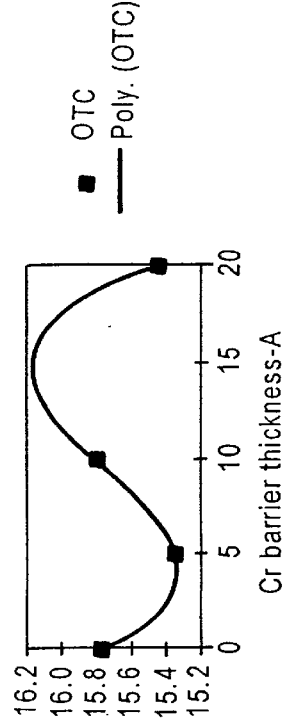
Figure 5F:
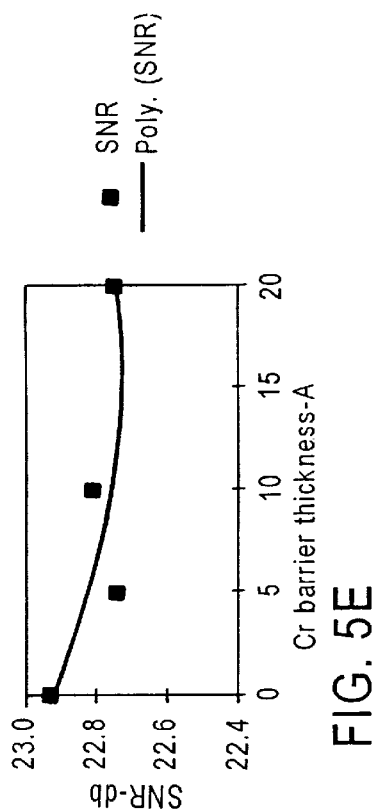

The advantageous effect of a Cr barrier layer on magnetic properties is reported in Table 3 below and illustrated in FIG. 4. It is observed that Hcr increased about 150 to 200 Oersted and stabilized at about 10 Å to about 20 Å of thickness.

TABLE 3

Effects of Cr Barrier Thickness On Magnetic Properties

| Sample # | Cr Barrier Thickness-A° | Hcr Oersted | Mrt memu/cm$^2$ | S* |
|---|---|---|---|---|
| Control | 0 | 2605 | 0.59 | 0.76 |
| Sample 1 | 5 | 2760 | 0.59 | 0.75 |
| Sample 2 | 10 | 2820 | 0.59 | 0.76 |
| Sample 2 | 30 | 2820 | 0.58 | 0.76 |

The advantageous impact of a Cr barrier layer on parametric performance is reported in Table 4 and illustrated in FIGS. 5A–5F. The data clearly indicate that as the Cr barrier layer increases in thickness, parametric performance is degraded. However, with a super thin layer of between about 5 Å and about 10 Å, parametric performance was superior in terms of improved PW50, resolution and overwrite. An optimum Cr barrier layer thickness can be considered about 5 Å to about 1 5 Å.

Magnetic recording media in accordance with the present invention can comprise any conventional substrate material, any of various conventional seed layers, underlayers and magnetic layers, protective overcoats and lubricant topcoats employed in manufacturing conventional recording media. For example, embodiments of the present invention can comprise the use of a Cr or Cr alloy underlayer of underlayers.

The present invention enables manufacture of magnetic recording media containing a protective overcoat, e.g., a protective overcoat containing carbon, nitrogen and hydrogen, formed by reactive sputtering in a nitrogen-containing atmosphere, without degradation of the magnetic properties or parametric performance of the magnetic layer. The present invention enjoys industrial utility in the production of various types of magnetic recording media, and is not limited to any particular substrate material, underlayer, magnetic layer, barrier layer, protective overcoat or lubricant topcoat.

Only certain embodiments of the present invention and but a few examples of its versatility are shown and described in the present disclosure. It is to be understood that the present invention is capable of use in various other combinations and environment, and is capable of changes and modifications within the scope of the inventive concept as expressed herein.

What is claimed is:

1. A magnetic recording medium comprising:
   a magnetic layer;
   a barrier layer, having a thickness of about 5 Å to about 15 Å and comprising chromium or a chromium alloy, on a magnetic layer; and
   a protective overcoat containing carbon and nitrogen, on the barrier layer, wherein the protective overcoat contains about 0.5 to about 5atomic % nitrogen.

2. The magnetic recording medium according to claim 1, wherein the protective overcoat contains at least about 0.25 volume percent nitrogen.

3. The magnetic recording medium according to claim 1, wherein the protective overcoat comprises amorphous nitrogenated carbon or amorphous hydrogenated-nitrogenated carbon.

4. A method of manufacturing a magnetic recording medium, the method comprising:
   sputter depositing a barrier layer comprising chromium or a chromium alloy, to a thickness of about 5 Å to about 15 Å, on a magnetic layer; and
   sputter depositing a protective overcoat, containing carbon and nitrogen, on the barrier layer in a nitrogen-containing atmosphere wherein the protective overcoat contains about 0.5 to about 5atomic % nitrogen.

5. The method according to claim 4, comprising sputter depositing the protective overcoat in an atmosphere containing at least 0.25 volume percent nitrogen.

6. The method according to claim 4, wherein the protective overcoat comprises amorphous nitrogenated carbon or amorphous hydrogenated-nitrogenated carbon.

* * * * *